June 1, 1965

D. J. HAYMAN 3,186,174

HYDRAULIC MASTER CYLINDER

Filed April 30, 1963

INVENTOR.
DENNIS J. HAYMAN
BY
*Walter Potwoko, Sr.*
ATTORNEY

June 1, 1965
D. J. HAYMAN
3,186,174
HYDRAULIC MASTER CYLINDER
Filed April 30, 1963
2 Sheets-Sheet 2
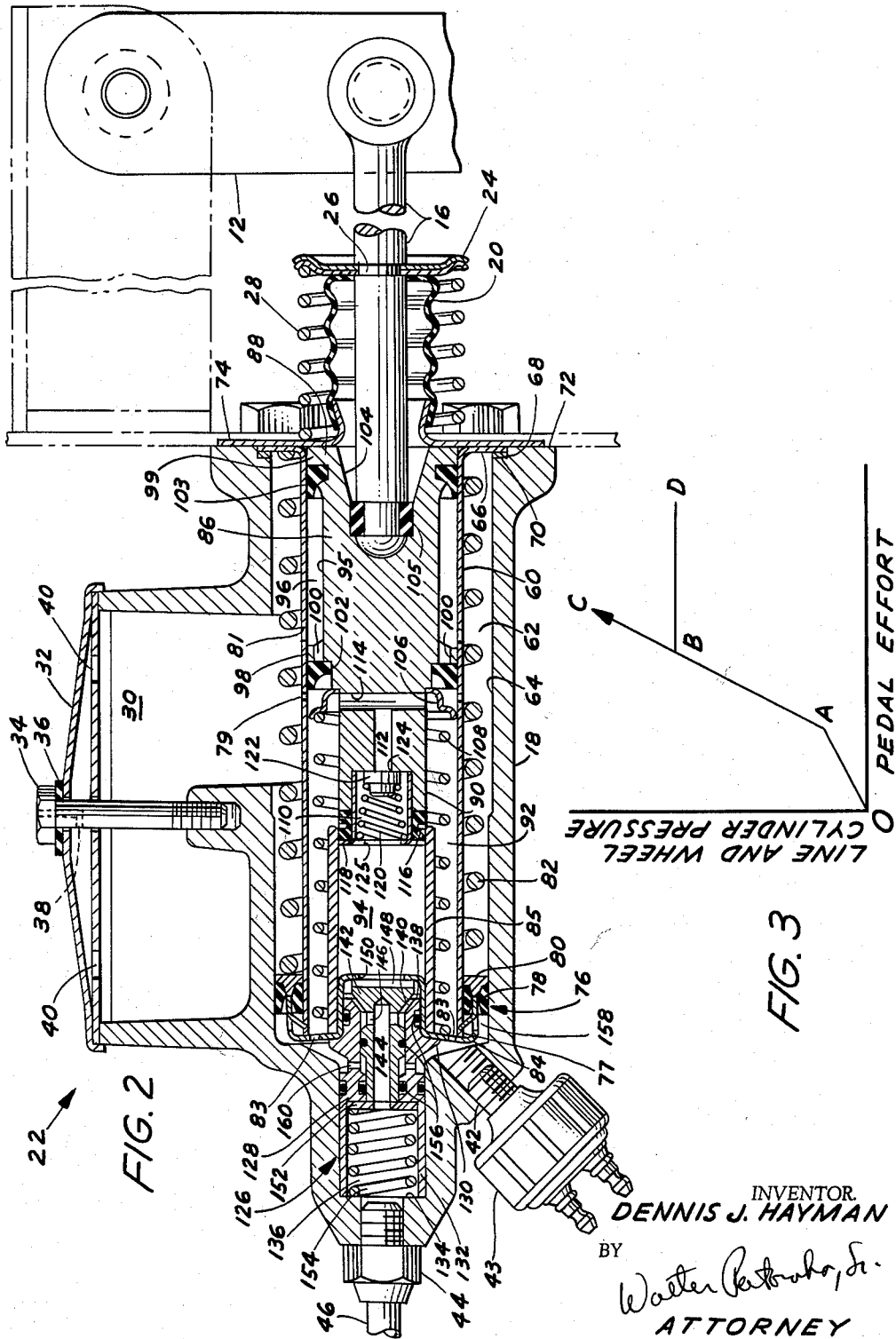
INVENTOR.
DENNIS J. HAYMAN
BY
ATTORNEY United States Patent Office 3,186,174
Patented June 1, 1965

3,186,174
HYDRAULIC MASTER CYLINDER
Dennis J. Hayman, East Detroit, Mich., assignor to Holley Carburetor Company, Warren, Mich., a corporation of Michigan
Filed Apr. 30, 1963, Ser. No. 276,706
7 Claims. (Cl. 60—54.6)

This invention relates generally to hydraulic brake systems, and more particularly to an improved two-stage master brake cylinder therefor.

The use of a two-diameter piston, or two pistons of different diameters, which enables an initial movement of a large volume of hydraulic fluid under a relatively low pressure for bringing the brake shoes into contact with the brake drums and a subsequent movement of a relatively small volume of fluid under high pressure for actually applying the braking force, is now well known. Furthermore, various means have been proposed for rendering the low pressure piston ineffective upon reaching a predetermined pressure, as well as for effecting a smooth transition from low to high pressure operation.

However, a major problem with these prior art devices is that either no really efficient means has been provided for preventing the possibility of excessive pressure accumulating in the lines leading from the high pressure end of the master cylinder to the wheel cylinders or the means suggested have been relatively complicated and expensive and, hence, impractical. Unless some provision is made for preventing such excessive pressures, an extremely rugged line and wheel cylinder system would be required. Otherwise, it is conceivable and very possible that under certain circumstances the hydraulic lines of such a two-stage system could burst, resulting in an obviously hazardous complete loss of braking.

While some proposed prior art mechanisms have successfully "relieved" the lines, such as by dumping additional fluid back to the reservoir, in doing so they have created another problem in that the foot pedal must travel all the way to the floor so long as additional force is applied. This would result in an extremely bad psychological reaction until one became accustomed to the "soft" pedal effect. However, with such a feature, one could never be certain that he wasn't, in fact, encountering a dangerous hydraulic failure.

Accordingly, as in the case of all prior two-stage hydraulic pressure producing devices, a general object of this invention is to provide a fluid brake master cylinder in which a large volume of fluid is first moved under a relatively low pressure to bring all brake shoes into contact with the brake drums, after which a small volume of fluid is moved under high pressure to apply the braking force.

A more specific object of this invention is to provide a two-stage hydraulic brake master cylinder or system having means for eliminating the possibility of excessive pressure build-up in the hydraulic line and wheel cylinder system during the high pressure braking stage.

A further object of the invention is to provide such a system which not only "limits" the pressure in the lines, but which also limits the travel of the foot pedal.

Another object of this invention is to provide a two-stage cylinder system which is relatively simple in structure, economical to manufacture, durable in use and automatic in operation.

Other objects and advantages of the invention will become more apparent when reference is made to the following specification and the accompanying drawings wherein:

FIGURE 2 is a cross-sectional view of a two-stage master cylinder that embodies the invention and that can be employed in the system shown by FIGURE 1.

FIGURE 3 is a plot of line and wheel cylinder pressure versus pedal effort for the various stages of operation.

Figure 1:
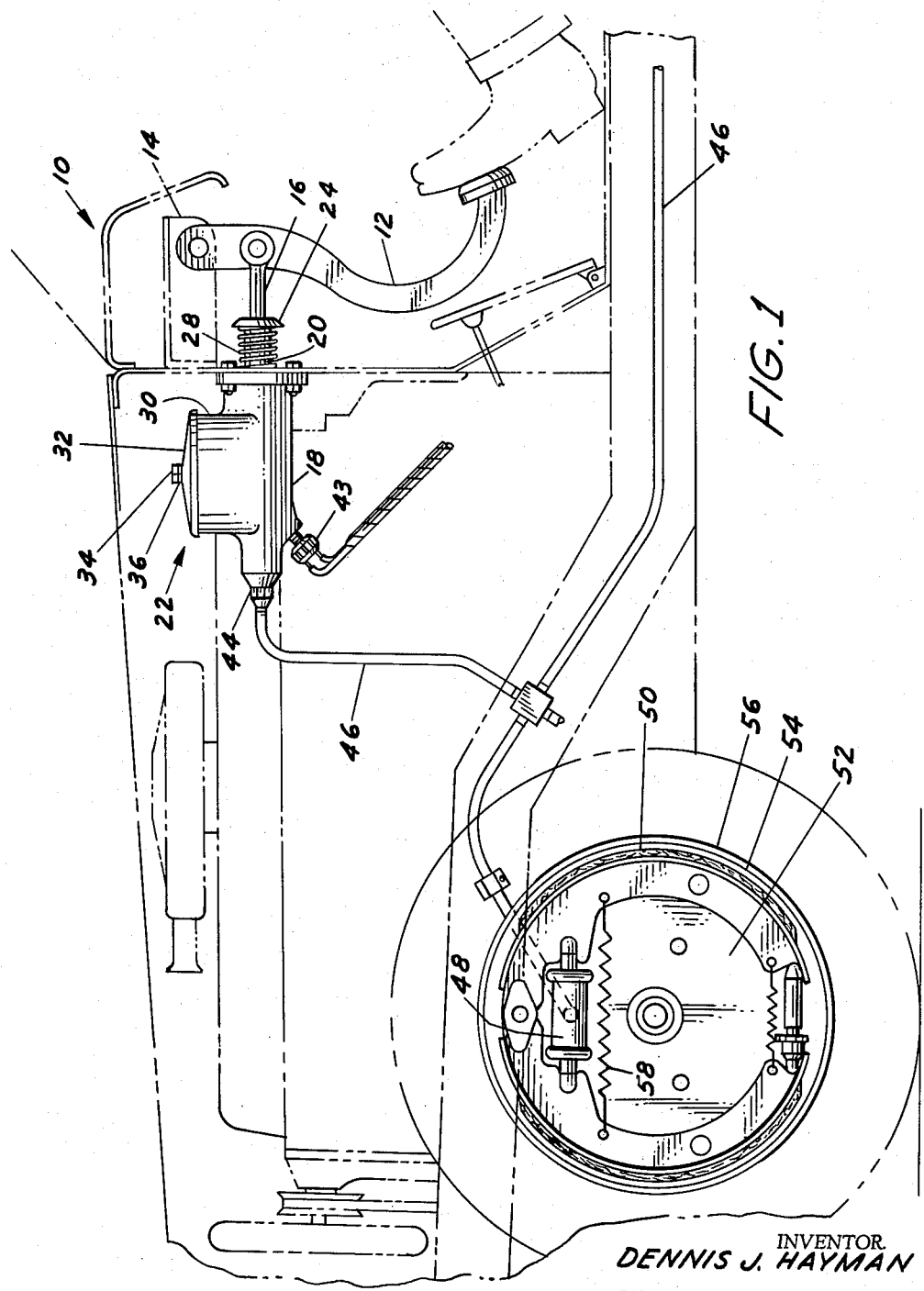
FIGURE 1 is a schematic illustration of a typical automotive hydraulic brake system.

Referring to the figure in greater detail, FIGURE 1 illustrates schematically a typical hydraulic brake system 10 having the usual foot pedal lever 12 pivotally connected to a fixed support 14. The actuating rod 16, pivotally connected to the lever 12, extends into the master cylinder housing 18 through a flexible boot 20 removably connected to the rod 16 and housing 18 for the purpose of excluding dust and other foreign substances from the master cylinder 22. A retainer 24 is fastened in a groove 26 (FIGURE 2) around the actuating rod 16 adjacent the pedal end of the flexible boot 20. A return spring 28 is confined between the retainer 24 and the master cylinder housing 18 around the flexible boot 20.

The master cylinder housing 18 includes the usual fluid reservoir 30 provided with a cover 32 held in place by some suitable means such as a bolt 34 and washer 36. As observed in FIGURE 2, an opening 38 through the bolt 34 and a plurality of openings 40 through an inner portion of the cover 32 may be employed to maintain the reservoir 30 at atmospheric pressure. An opening 42 may be formed in the housing 18 for the insertion of a stop light switch 43. The exit end of the master cylinder 22 is provided with a discharge port 44 which is connected via hydraulic pressure lines 46 to the usual four hydraulic pressure actuator wheel cylinders 48 associated with the brake shoes 50.

The brakes may be of any conventional type, and they would normally include a fixed backing plate 52, a rotatable drum 54 secured for rotation with a wheel 56 to be braked, a pair of friction elements or shoes 50 pivotally secured to the backing plate 52 and cooperating with the drum 54, a retractile spring 58 connecting the shoes 50, and the wheel cylinder 48 mounted on the backing plate 52. The wheel cylinder 48 is located between the shoes 50 and connected thereto for actuating the shoes 50 into engagement with the drum 54 against the resistance of the retractile spring 58.

Looking now at FIGURE 2, the housing 18 includes a flanged outer sleeve 60 forming a chamber 62 with the bore 64 of the housing 18, the flange 66 of the sleeve 60 being held in place against a seal 68 in a counterbore 70 formed in the end 72 of the housing 18 by an end cover 74. A seal assembly 76 surrounds the sleeve 60 substantially near the end 77 opposite the flange 66 and serves to seal off the chamber 62. The seal assembly 76 includes a seal ring 78 and a seal back-up member 80. A spring 82 is confined between the flange 66 and the seal back-up member 80 in the chamber 62. The end 77 of the sleeve 60 is butted against a formed plate 84, a protruding portion of which forms a mount for a smaller diameter tubular sleeve 85 within the downstream end of the larger sleeve 60. Ports 79 and 81 are formed through the wall of the sleeve 60 and ports 83 are formed through the forward portion of the formed plate 84 for purposes which will be described later.

A piston 86 is formed to include two effective diameters, the larger diameter portion 88 being slidably mounted within the larger sleeve 60 and the smaller diameter portion 90 slidably extending into the smaller sleeve 85. This forms a low pressure chamber 92 with the large sleeve 60 and a high pressure chamber 94 with the small sleeve 85. The larger diameter portion 88 includes a recessed section 95 forming a chamber 96 between two collar sectioins 98 and 99 located substantially near the ends thereof. A plurality of ports 100 extend through the collar 98. Front and rear seal rings 102 and 103 are positioned downstream of and adjacent to the collar sections 98 and 99. The pedal end of the larger diameter portion 88 includes a central recess 104 for insertion of the actuating rod 16. The rod 16 may be held in place in the recess 104 by some suitable means such as a flexible bushing 105.

A spring seat 106 abuts against the forwad end of the large diameter portion 88, and a return spring 108 is confined between the spring seat 106 and the formed plate 84 in the low pressure chamber 92.

The smaller diameter portion 90 of the piston 86 includes a central chamber 110 at its forward end and an axial passageway 112 leadings from the chamber 110 to a transverse passageway 114 which is in communication with the low pressure chamber 92. A seal ring 116 is confined against the front of the small diameter portion 90 in the high pressure chamber 94 by a flanged sleeve 118, the latter also serving as a retainer for a spring 120 which urges a check valve 122 toward a closed position against the outlet 124 of the axial passageway 112. The sleeve 118 contains an opening 125 through its flanged end.

The pressure limiting valve assembly 126 comprises a valve body 128 having a shoulder 130 which abuts against the forward wall of the formed plate 84 and a cylindrical extension 132 which abuts against a wall 134 of the master cylinder housing 18, forming an outlet chamber 136 therewith. The upstream end 138 of the valve body 128 forms a seat 140 for a valve 142. The valve 142 is slidably mounted within the valve body 128 and contains a central passageway 144 and ports 146 which, when the valve 142 is open, communicate between the outlet chamber 136 and the high pressure chamber 94 past the seat 140 and through a slot 148 in the head of the valve 142 and, thence, through a central opening 150 in the formed plate 84. A plate or washer 152 is abutted against the downstream end of the valve 142. A spring 154 is confined between the wall 134 of the housing 18 and the plate 152. Several seal rings 156 in appropriate grooves prevent leakage past the outside portions of the valve body 128 and the valve 142.

*Operation*

FIGURE 2 shows the system 22 in its inactive or repose position. Assuming now that the operator begins to apply the brakes, his depression of the foot pedal lever 12 advances the master cylinder actuating rod 16, which in turn moves the two-diameter piston 86 forward, or to the left in FIGURE 2. The seal rings 102 and 103 and the spring seat 106 move with the piston 86 as a unit until such time as the seal ring 102 has passed the port 79, all the while compressing the return spring 108. This forward movement causes the fluid in the low pressure chamber 92 to be displaced through the passageways 114 and 112, past the check valve 122, through the chamber 110 and the opeiiing 125 into the high pressure chamber 94. This incoming fluid, of course, combines with the fluid in the chamber 94, resulting in the effective area being substantially equal to that of the larger piston 86 plus the seal ring 102.

The fluid thus displaced by virtue of very low foot pedal force can be seen to be of a relatively large volume; it passes through the opening 150 and thence around the pressure limiting valve 142, past the seat 140, through the ports 146, the passage 144 and the chamber 136 and out the outlet port 44 to the lines 46 (FIGURE 1) and wheel cylinders 48, bringing the brake shoes 50 quickly into contact with the brake drums 54. This first stage operation is represented by curve OA of FIGURE 3.

Once the slack in the system has been thus taken up, the resultant predetermined pressure will close the check valve 122 against the opening 124 of the passageway 112, thereby preventing any further flow into the high pressure chamber 94 from the low pressure chamber 92. At this point, additional fluid from the low pressure chamber 92 will flow through the ports 83 in the formed plate 84 and into the cavity 158, displacing the seal assembly 76 rearwardly against the force of the accumulator spring 82. The large diameter of the piston 86 is thus rendered inoperative as a pressure building means, and the transition from the low to the high pressure producing means is complete. Further movement of the hydraulic fluid is now produced solely by the small diameter piston 90; thus, a small volume of fluid is now moved under high pressure to apply the braking force. This second stage operation is represented by curve AB of FIGURE 3.

In those two-stage systems wherein the hydraulic fluid is entrapped in front of the small piston 90, additional force on the brake foot pedal lever 12 would increase the braking pressure indefinitely as along curve BC of FIGURE 3. In contrast to this, the invention herein proposed will prevent this possibility of extremely unsafe excessive line pressures. This is accomplished when, at some predetermined maximum line pressure level, the forces on the differential end areas of the pressure limiting valve 142 cause the valve 142 to close against the seat 140, overcoming the force of the spring 154, the fluid displaced by the valve 142 escaping through the ports 160 into the cavity 158. This seals off the chamber 136, and hence the lines 46, from the source of pressure, namely the high pressure chamber 94. The pressure in chamber 94 may continue to build up, so long as the high input forces are manually applied to the actuating rod 16; however, this increased ressure is ineffective beyond the closed pressure limiting valve 142 since the valve housing 128 is abutted against the wall 134 of the master cylinder housing 18. The result of this is a hydraulic lock because the fluid in the high pressure chamber 94 is incompressible. Therefore, further forward movement of the piston 86, and hence the foot pedal lever 12, is impossible. The resultant curve, insofar as the line 46 and wheel cylinder 48 circuit is concerned, would be as per line BD of FIGURE 3.

Upon release of the brake foot pedal 12, the pressure limiting valve 142 is unseated, allowing a return flow past valve 142 and into the chamber 94. The piston assembly 88 is retracted by virtue of the return spring 108, while the seal assembly 76 is moved back against its stop, namely, the formed plate 84, by the accumulator spring 82.

In the event that any fluid has been lost from the system prior to or during this retraction, there would result a slight vacuum in the low pressure chamber 92 and throughout the whole brake line system. Should this occur, fluid in the reservoir 30 would be forced by atmospheric pressure through the opening 81 in the large diameter sleeve 60 into the cavity 96 and thence through the ports 100, past the seal ring 102 into the low pressure chamber 92, thereby replenishing the lost fluid.

It should be apparent from the above description of the invention that a two-stage brake master cylinder has been provided which overcomes the previously-mentioned objections to most prior art two-stage master cylinders, that is, the possibility of building up excessive pressures in the second high pressure stage has been eliminated.

Furthermore, it is evident that the proposed invention overcomes the additional objection encountered in many prior art systems that "relieve," rather than "limit," the line pressure, the objection being the inherent characteristic of allowing the foot pedal to travel all the way to the floor.

Additionally, it should be apparent that the structure described is relatively simple and economical to manufacture.

Although but one embodiment of the invention has been disclosed and described, it is apparent that other modifications may be made within the scope of the appended claims.

What I claim as my invention is:

1. In a hydraulic vehicle braking system having a foot pedal, an actuating rod, a fluid reservoir, and a line leading to a wheel cylinder, a two-stage master cylinder, said cylinder comprising a low pressure chamber, a high pressure chamber, first valve means for moving the larger volume of fluid from said low pressure chamber, second valve means for limiting the pressure in said line and for limiting the movement of said foot pedal, and means associated with said low pressure chamber for receiving the fluid displaced from said low pressure chamber after said first valve means closes.

2. In a hydraulic vehicle braking system having a foot pedal, an actuating rod, a fluid reservoir, and a line leading to a wheel cylinder, a two-stage master cylinder, said cylinder comprising a pair of concentric sleeves fixedly mounted in the bore of said cylinder, a two-diameter piston slidably associated with said pair of sleeves, means for limiting the pressure in said line and for limiting the movement of said foot pedal, said means including first and second valve means and a chamber for receiving the fluid displaced by said piston after said first valve means closes.

3. In a hydraulic braking system having a foot pedal, a wheel cylinder and a line leading thereto, a master cylinder, said cylinder comprising a reservoir, a pair of concentric sleeves, a two-diameter piston slidably mounted in said concentric sleeves, pressure limiting means on the high pressure side of the smaller end of said two-diameter piston for preventing the build-up of pressure above a designated level in said line and wheel cylinder due to foot pedal force, and hydraulic lock means for limiting the movement of said foot pedal once said predetermined line pressure is attained.

4. In a hydraulic braking system having a foot pedal, a wheel cylinder and a line leading thereto, a master cylinder, said cylinder comprising a reservoir, a pair of concentric sleeves, a two-diameter piston slidably mounted in said concentric sleeves, pressure limiting means fixedly mounted on the high pressure side of the smaller end of said two-diameter piston for preventing the build up of pressure above a designated level in said line and wheel cylinder due to foot pedal force, said pressure limiting means including a valve housing having a valve seat formed at one end thereof and a cylindrical extension formed on the other end thereof, said cylindrical extension being abutted against an end wall of said master cylinder, a member slidably mounted in the upstream end of said cylindrical extension and forming a spring seat, a spring mounted between said spring seat and said end wall within said cylindrical extension, and a passageway through said member extending from the downstream end of said member to a point adjacent to and immediately downstream of said valve seat, said passageway serving to communicate with said high pressure side of the smaller end of said two-diameter piston through said valve seat when said member is urged away from said valve seat.

5. A two-stage brake master cylinder, said cylinder comprising a bore therethrough, a fluid reservoir adjacent said bore, a first sleeve fixedly attached in said bore and forming a first chamber with said bore, a second sleeve concentrically mounted within said first sleeve, a multi-diameter piston having its largest diameter portion slidably mounted in said first sleeve and its smallest diameter portion slidably inserted in said second sleeve, said largest diameter portion being recessed to form a second chamber with said first sleeve, said smallest diameter portion and said second sleeve forming a third chamber with said first sleeve, a pressure limiting and foot pedal movement limiting valve associated with the downstream end of said second sleeve, said valve and said smallest diameter portion forming a fourth chamber with said second sleeve, a passageway formed through said smallest diameter portion communicating between said third chamber and said fourth chamber, a spring-loaded check valve for at times shutting off the flow through said passageway, a seal assembly surrounding said first sleeve in said first chamber and urged toward the downstream end of said first sleeve by a spring, and a means of communication between said third chamber and said first chamber for at times slidably moving said seal assembly against the force of said spring.

6. In a hydraulic vehicle braking system having a foot pedal, a foot pedal lever actuating rod and a line leading to a wheel cylinder, a master cylinder, said cylinder comprising a reservoir, a pair of concentric sleeves forming high and low pressure chambers, a two-diameter piston slidably mounted in said concentric sleeves, spaced seal rings surrounding the large diameter of said two-diameter piston near the ends thereof, a seal ring surrounding the small diameter of said two-diameter piston at the forward end thereof, an opening through the larger of said pair of concentric sleeves, said opening at times communicating between said reservoir and said low pressure chamber, a conduitry system in the small diameter portion of said two-diameter piston, said conduitry system at times communicating between said low pressure chamber and said high pressure chamber, a spring biased check valve mounted in a recess in said small diameter portion for at times closing off the flow through said conduitry system, a combination pressure limiting and foot pedal movement limiting valve assembly associated with the downstream end of said high pressure chamber, a seal assembly surrounding said larger sleeve substantially near the downstream end thereof, a spring confined between said seal assembly and a wall of said housing, and a second opening through said larger sleeve communicating between said reservoir and the chamber formed between said spaced seal rings.

7. In a hydraulic vehicle braking system having a foot pedal, an actuating rod, a fluid reservoir, and a line leading to a wheel cylinder, a two-stage master cylinder, said cylinder comprising a low pressure chamber, a high pressure chamber, valve means for moving the larger volume of fluid from said low pressure chamber, means for limiting the pressure in said line and for limiting the movement of said foot pedal, said means being such that any further pressure against said foot pedal serves to further assure the limitation of pressure in said line, and means associated with said low pressure chamber for receiving the fluid displaced from said low pressure chamber after said valve means closes.

References Cited by the Examiner
UNITED STATES PATENTS 2,666,294 1/54 Porter _____ 60—54.6
3,010,283 11/61 Jansson _____ 60—54.5

FOREIGN PATENTS
480,045 4/53 Italy.

JULIUS E. WEST, *Primary Examiner.*

EDGAR W. GEOGHEGAN, *Examiner.*